United States Patent [19]

Lambeth

[11] Patent Number: 4,527,891
[45] Date of Patent: Jul. 9, 1985

[54] RANGEFINDER DEVICE WITH SERIAL READOUT LINEAR IMAGE SENSOR AND PEAK DETECTOR WITH THRESHOLD SETTING MEANS

[75] Inventor: David N. Lambeth, Webster, N.Y.
[73] Assignee: Eastman Kodak Company, Rochester, N.Y.
[21] Appl. No.: 409,258
[22] Filed: Aug. 18, 1982
[51] Int. Cl.³ ............................ G01C 3/10; G03B 7/08
[52] U.S. Cl. .......................................... 356/1; 354/403
[58] Field of Search ............... 356/1, 4; 354/402, 403, 354/404, 405, 406, 407, 408, 409, 25

[56] References Cited

U.S. PATENT DOCUMENTS

| | | | |
|---|---|---|---|
| 4,004,852 | 1/1977 | Pentecost | 356/4 X |
| 4,268,137 | 5/1981 | Cocron et al. | 354/409 X |
| 4,269,491 | 5/1981 | Hagyuda et al. | 356/4 X |
| 4,274,735 | 6/1981 | Tamura et al. | 356/1 |
| 4,284,335 | 8/1981 | Takemae et al. | 354/409 X |
| 4,368,978 | 1/1983 | Tsunekawa et al. | 356/1 |
| 4,382,665 | 5/1983 | Eguchi et al. | 354/409 |
| 4,425,031 | 1/1984 | Tamura et al. | 354/403 |
| 4,437,743 | 3/1984 | Sakai et al. | 354/402 |

Primary Examiner—S. C. Buczinski
Assistant Examiner—John B. Sotomayor
Attorney, Agent, or Firm—Thomas H. Close

[57] ABSTRACT

A rangefinder device includes means for projecting a beam of light to illuminate a spot on an object in a scene. A linear image sensor views the scene and produces a series of photosignals representing the brightness of the scene. Signal processing electronics responsive to the photosignals from the linear image sensor detect the location of the illuminated spot in the scene and produce a distance signal representing the distance to the object. The signal processing electronics include:
  a counter that is advanced each time a photosignal is received from the image sensor;
  a latch connected to the counter and responsive to a control signal for temporarily storing the current count of the counter; and
  a peak detector responsive to the photosignals for producing an output signal each time a new greater photosignal is received.

The output signal of the peak detector is supplied to the latch as the control signal. After the series of photosignals has been produced by the image sensor, the count remaining in the latch represents the location of the illuminated spot in the scene. The peak detector includes means for setting a threshold peak value below which no peak is detected.

8 Claims, 5 Drawing Figures

RANGEFINDER DEVICE WITH SERIAL READOUT LINEAR IMAGE SENSOR AND PEAK DETECTOR WITH THRESHOLD SETTING MEANS

BACKGROUND OF THE INVENTION

Cross Reference to Related Applications

Subject matter claimed in this application is disclosed but not claimed in the following copending applications filed on even date herewith:

Ser. No. 409,256 entitled "Image Sensor and Rangefinder Device Having Background Subtraction with Paired Analog Shift Registers" by C. Anagnostopoulos;

Ser. No. 409,257 entitled "Image Sensor and Rangefinder Device Having Background Subtraction with Bridge Network" by L. Frank and C. Anagnostopoulos; and Ser. No. 409,259 entitled "Image Sensor and Rangefinder Device with Background Subtraction Using Interlaced Analog Shift Register" by D. Lambeth.

Field of the Invention

The present invention relates to automatic rangefinder devices of the type wherein a beam of light is projected onto a scene to illuminate a spot on an object in the scene, a linear image sensor senses an image of the scene, and signal processing electronics responsive to the signals produced by the image sensor detect the location of the spot in the image to determine the distance to the object. More particularly, the present invention relates to improved means for processing the signals from the image sensor and more particularly for detecting the location of the image of the spot.

Description of the Problem

In one type of automatic rangefinder, a beam of light is projected onto an object in a scene to form an illuminated spot on the object. An image of the scene including the illuminated spot, is formed on a linear array of photosensors. The location of the illuminated spot along the linear array is determined, to measure the distance to the object in a scene. Such rangefinding devices find application, for example, in automatic focusing cameras.

The general arrangement of elements and the mode of operation of such a rangefinding device will be described with reference to FIG. 1. Means for projecting a beam of light is shown by way of example as a light emitting diode (LED) 10 and a lens 12. The beam is projected along a path 14 to illuminate a spot on an object $O_1$ in a scene. The scene is imaged by a second lens 16 onto a linear array of photosensors 18. The signals produced by the photosensors are analyzed by control electronics 20 to determine the position of the illuminated spot in the scene and produce a signal representing the distance to the object.

As shown by example in FIG. 1, the apparent position of the illuminated spot in the scene is a function of distance along light path 14 to the object. For an object $O_1$ located at a distance $D_1$ from the rangefinding device, the image of the illuminated spot will fall on the sensor array at location $S_1$. For an object $O_2$ at a further distance $D_2$, the image of the spot will fall on the sensor array at location $S_2$. By examining the output of the sensor array, the control electronics determines (for example, by comparing the outputs of the elements to determine that output which is a maximum) the location of the illuminated spot in the scene and thereby the distance to the object.

One way of accomplishing this comparison is shown in U.S. Pat. No. 4,274,735 issued June 23, 1981 to Tamura et al. In the device disclosed by Tamura et al, each photosignal is compared with all the others by an array of comparators, one comparator for each photosensor in the array, to determine the location of the illuminated spot by sensing the largest signal produced by the array of photosensors. If the sensor array comprises more than a few photosensors, the use of an array of comparators to determine the maximum signal from the array of photosensors greatly complicates the signal processing circuitry.

There was a need therefore, to simplify the signal processing electronics of the rangefinder so that the number of photosensors in the array could be increased.

SOLUTION TO THE PROBLEM—SUMMARY OF THE INVENTION

The above-noted problems are solved according to my invention by providing a rangefinder device of the type described above with an image sensor that produces a serial train of photosignals representing the brightness of the image, and signal processing electronics, including a peak detector, for detecting the greatest photosignal in the series to determine the location of the spot on the image sensor. The signal processing electronics includes a counter that is advanced each time a photosignal is received from the image sensor. A latch circuit, connected to the counter, is responsive to a control signal for temporarily storing the count of the counter. A peak detector, responsive to the photosignals, produces an output signal each time a photosignal larger than any previous photosignal is received. The output signal of the peak detector is supplied to the latch circuit as a control signal, whereby, after the series of photosignals has been produced by the image sensor, the count remaining in the latch represents the location of the illuminated spot on the sensor.

According to the preferred embodiment of the invention, the peak detector comprises: (1) a storage capacitor for storing the value of the last greatest photosignal; (2) a comparator for comparing the value on the storage capacitor with the value of the next photosignal produced by the image sensor, and producing an output signal whenever the value of the photosignal is greater than the value on the storage capacitor; and (3) switching means responsive to the output signal for replacing the value on the storage capacitor with the value of the greater photosignal.

According to a further feature of the invention, means are provided for storing an initial threshold value on the storage capacitor.

BRIEF DESCRIPTION OF THE DRAWINGS

The invention will be described with reference to the accompanying drawings, wherein.

DESCRIPTION OF THE PREFERRED EMBODIMENTS

Figure 1:
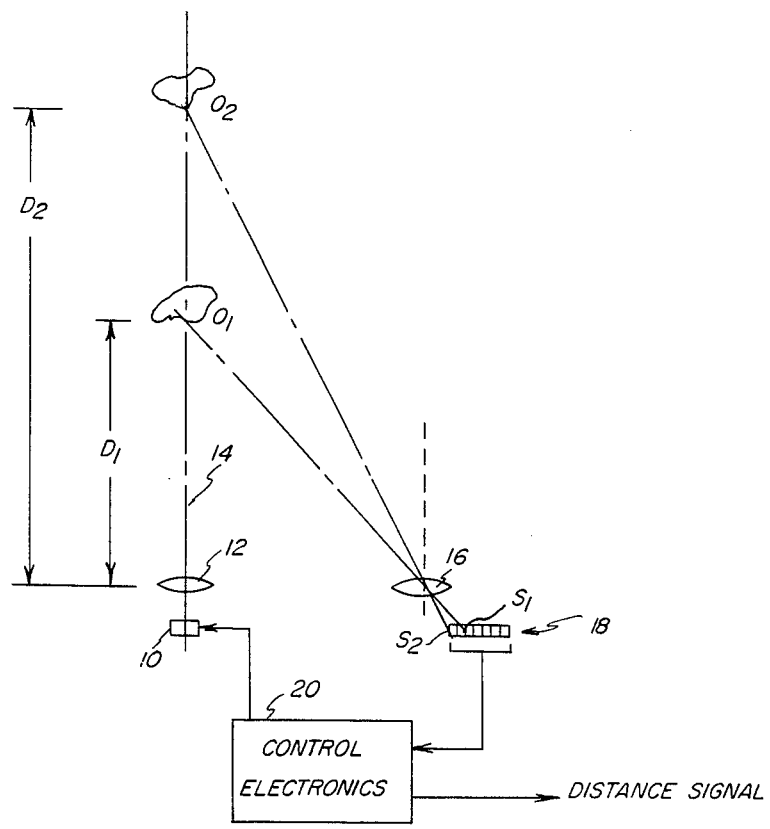
FIG. 1 is a schematic diagram of a rangefinder of the type to which the present invention pertains.
Figure 2:
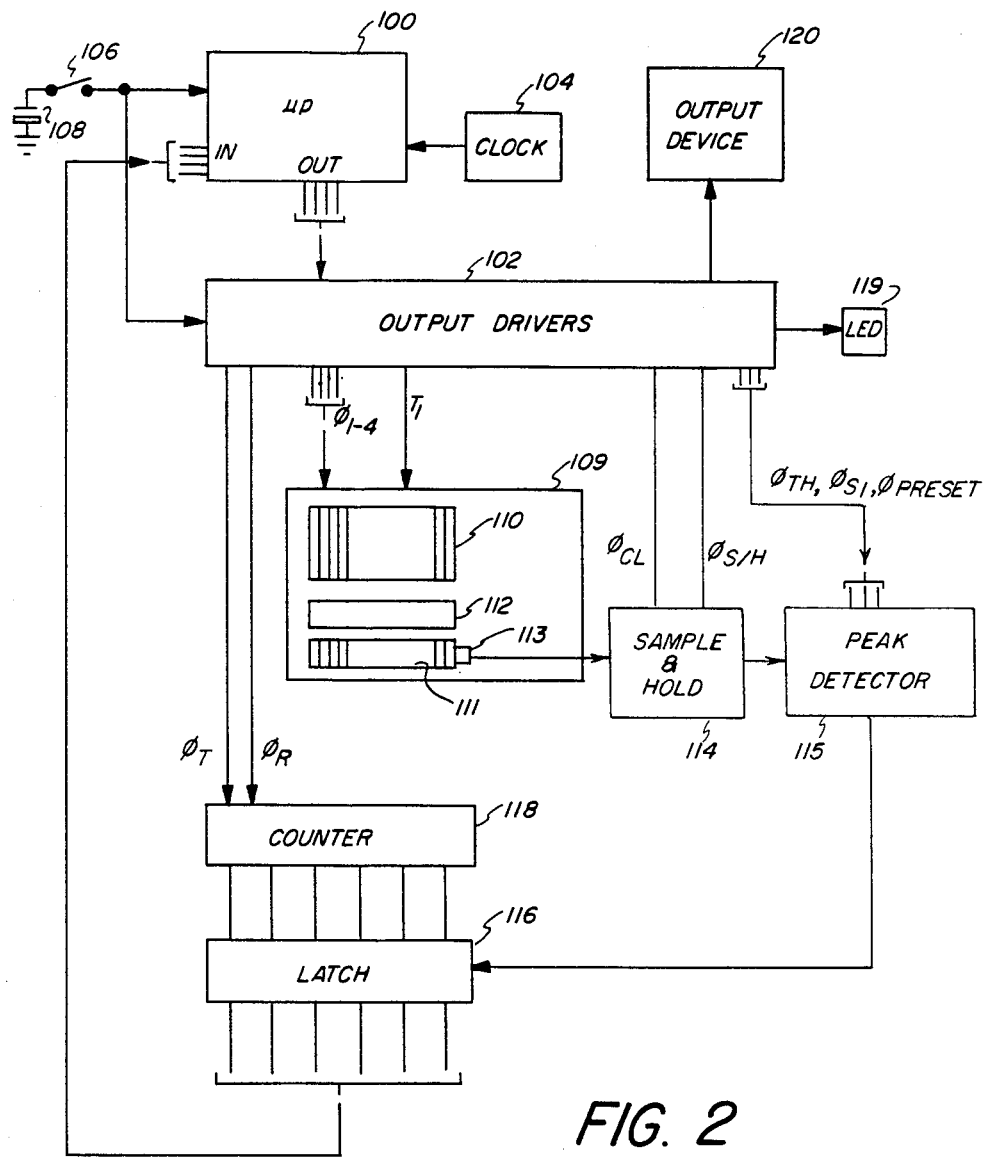
FIG. 2 is a schematic block diagram showing the signal processing and control electronics of a rangefinder according to the present invention.

Referring first to FIG. 2, over all control of the rangefinder is provided by a programed microprocessor 100 via conventional driver circuits 102. The microprocessor 100 is supplied with timing signals from a clock circuit 104 and with power via a main power switch 106 from a battery 108. The image sensing portion of the rangefinder includes a serially scanned linear image sensor 109 of the type having an array of photosensors 110 and means for serially addressing the photosensors, such as a CCD shift register 111. Such serially scanned linear image sensors are readily available commercially, and generally require a transfer signal $T_1$ to actuate a transfer gate 112 to transfer photosignals generated in the photosensors in parallel to the shift register 111, and a multiphase (e.g. 4-phase) clock signal $\phi_{1-4}$ to cause the CCD shift register to deliver the photosignals serially to an output diode 113. An image sensor particularly adapted for use in a rangefinder, including means for removing the background signal from the photosignals produced by the photosensors, leaving only photosignals due to the illuminated spot, is disclosed in copending U.S. application Ser. No. 409,257 entitled "Image Sensor and Rangefinder Device Having Background Subtraction with Bridge Network" filed on even date herewith by C. Anagnostopoulos and L. F. Frank. The 4-phase clock signals $\phi_{1-4}$ and the transfer signal $T_1$ are supplied to the linear sensor array 109 from output driver 102 under control of microprocessor 100 to produce output signals from the CCD shift register 111. The signals from the CCD shift register are sampled by a sample and hold circuit 114 and are supplied to a peak detector circuit 115 that produces a pulse each time a photosignal larger than any previous photosignal is received from image sensor 109. The output of the peak detector circuit is supplied to a latch circuit 116. Latch circuit 116 is connected to the outputs of a digital counter 118. Counter 118 receives a reset signal $\phi R$ and a timing signal $\phi_T$ having the same frequency as the 4-phase clock signals $\phi_{1-4}$. The output of the latch circuit 116 is supplied to an input port of microprocessor 100.

The driver circuit 102 also powers an LED 119 in the beam forming portion of the rangefinder and an output device 120 such as a range display or a range servo.

Figure 3:
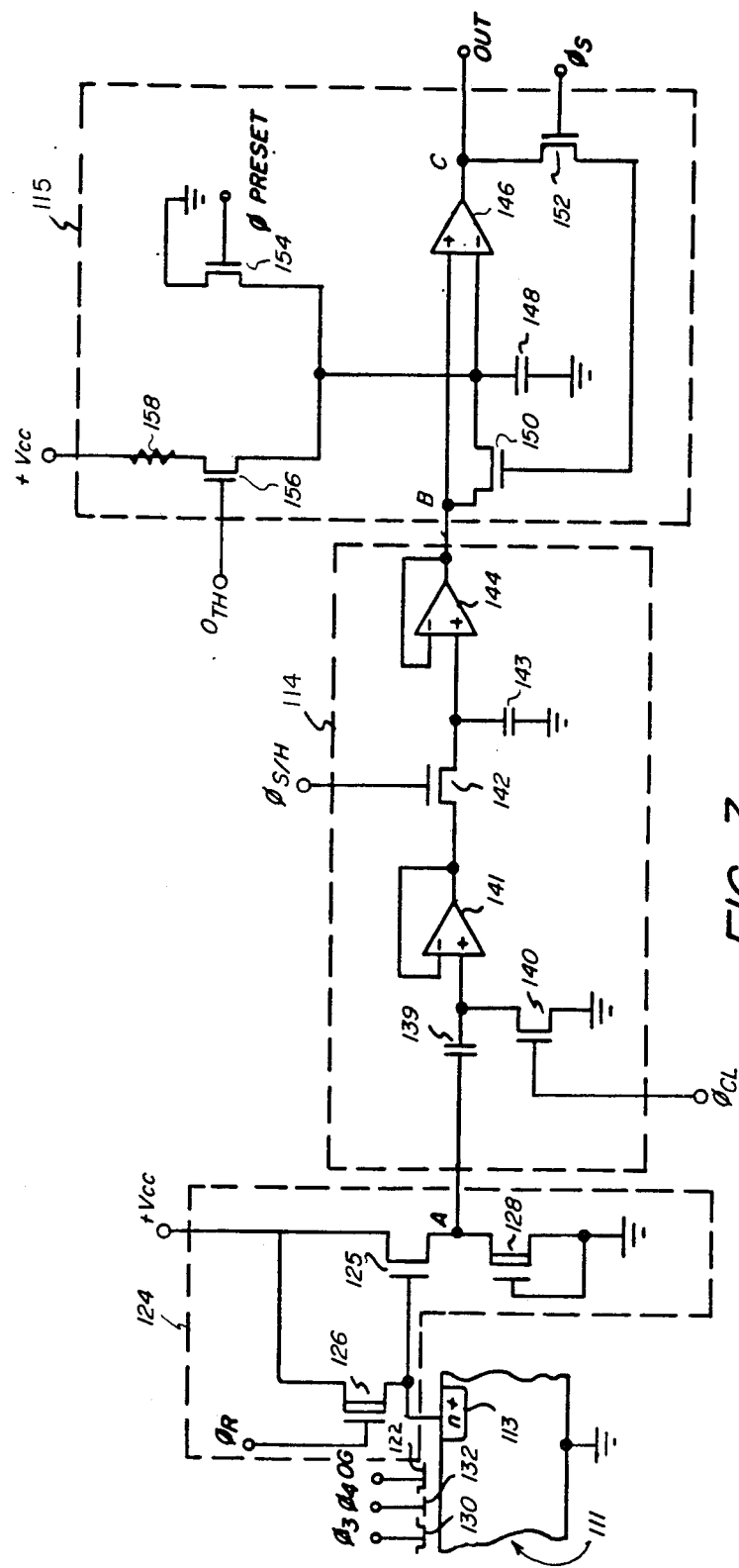
FIG. 3 is an electrical circuit schematic diagram showing the signal processing electronics for peak detecting according to the present invention.

FIG. 3 is a more detailed circuit schematic of the signal processing electronics shown in FIG. 2. A portion of the CCD shift register 111 including phase 3 and phase 4 transfer electrodes 130 and 132 respectively, an output gate 122, and an output diode 113 is shown.

The output amplifier 124 is an on-chip sense and reset amplifier including a sense FET 125 and a reset FET 126. The sense FET 125 is a surface channel device, and the reset FET 126 is a buried channel device. A buried channel FET 128 is connected between the drain of the FET 125 and ground in a constant current configuration for converting the sensed charge on diode 113 to a voltage at node A. A sample and hold circuit 114 comprising a clamping portion having a series capacitor 139, a clamping FET 140, and a buffer amplifier 141; and a sample and hold portion comprising a sampling FET 142, a storage capacitor 143, and an amplifier 144 samples the output voltage at node A and holds the voltage at node B.

The peak detector circuit 115 according to the present invention, comprises a comparator 146, a reference capacitor 148,, a sampling FET switch 150, and a timing FET switch 152. The peak detector circuit contains a threshold setting portion comprising a preset FET switch 154 connecting capacitor 148 to ground, and a threshold setting FET switch 156 connecting the power supply voltage Vcc to capacitor 148 through a resistor 158.

Figure 4:
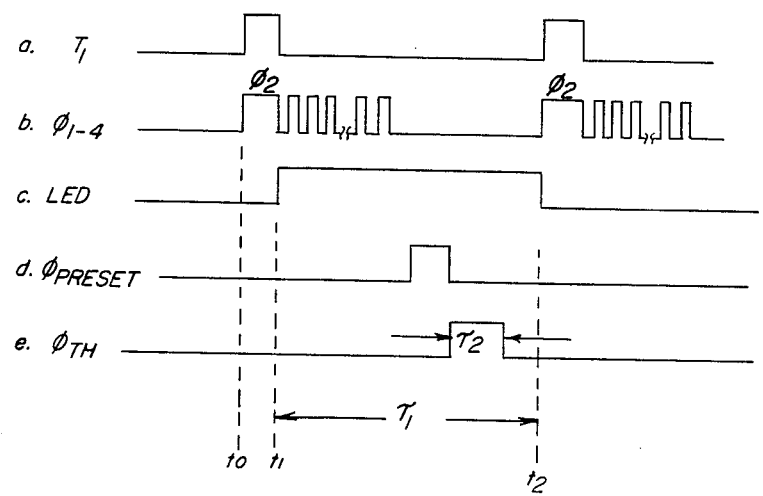
FIGS. 4 and 5 are timing diagrams useful in explaining the operation of the rangefinder according to the present invention.
Figure 5:
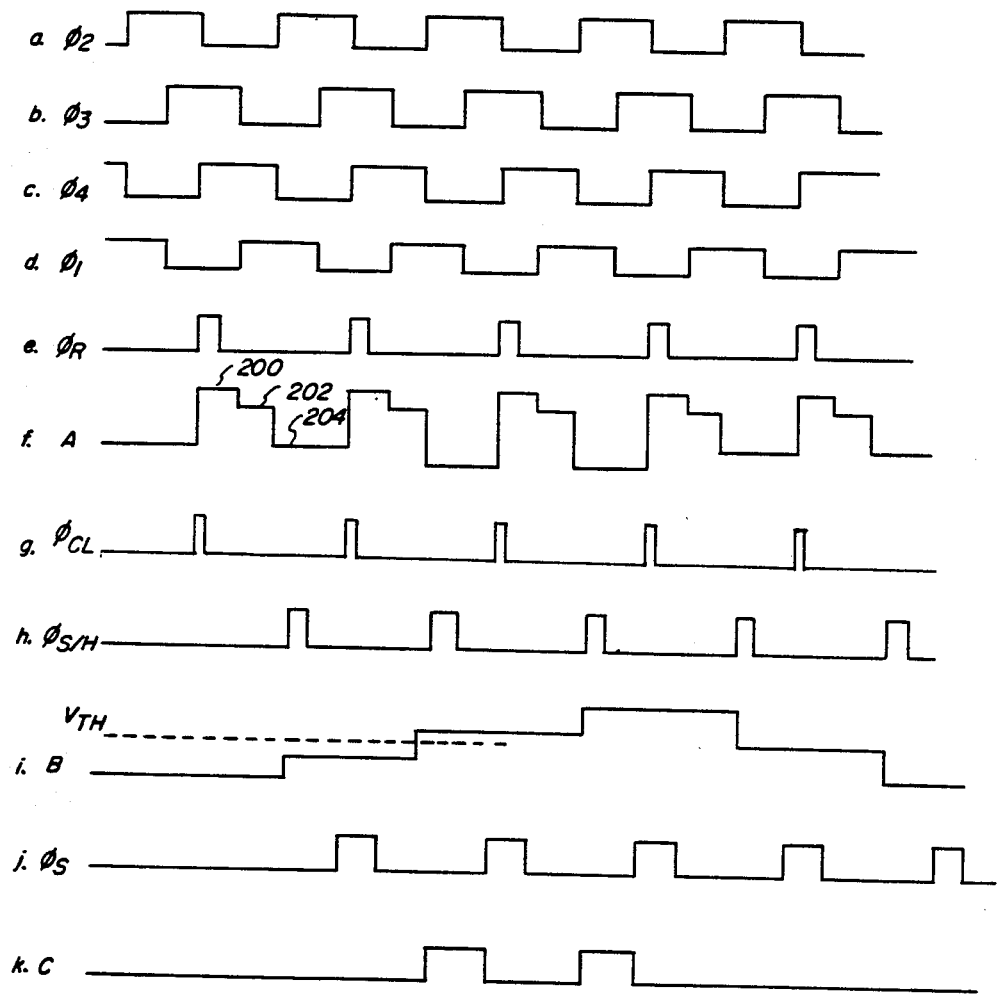

The operation of the rangefinder will now be described with reference to FIGS. 4 and 5. To begin, for example upon closure of main power switch 106 at time $t_o$, (see FIG. 4) the microprocessor initializes the photosensor array by transferring any accumulated photocharge from photosensors 110 into shift register 111 by applying a $T_1$ transfer pulse to transfer gate 112, (FIG. 4a) while phase 2 ($\phi_2$) of the 4-phase clock signal is held high. The 4-phase clock signal $\phi_{1-4}$ is then applied to the CCD shift register to empty any residual charge therefrom (see FIG. 4b).

Next, at time $t_1$, the microprocessor turns on LED 119. LED 119 is kept on for a time $\tau_1$ to integrate photocharge in the photosensors, during which time, the signal processing circuitry is initialized to set the threshold of the peak detector. FET switch 154 (see FIG. 3) is turned on momentarily by generating a $\phi_{preset}$ pulse (see FIG. 4d) to ground capacitor 148. Then, FET switch 156 is closed for a time $\tau_2$ to charge capacitor 148 to a value determined by the time constant of resistor 158 and capacitor 148. At time $t_2$, the LED is turned off and the photosignals generated by the sensor array are transferred to the CCD shift register 111 by applying a pulse $T_1$ to transfer gate 112 (see FIG. 4a). The CCD shift register is then read out to generate the range signal by applying the 4-phase clock signal $\phi_{1-4}$ to the transfer electrodes of the shift register (see FIG. 4b).

Processing of the photosignals from the CCD shift register 111 will now be described with reference, to FIG. 5. The 4-phase clock signals $\phi_{1-4}$ are shown in FIGS. 5a–d. While the signal charge resides under the phase 3 and phase 4 electrodes, 130 and 132 respectively, ($\phi_3$ and $\phi_4$ simultaneously high) a reset pulse $\phi_R$ is applied to buried channel FET transistor 126 to prepare the output diode 113 to receive the signal charge. At this point, node A of the output amplifier 124 goes to a high level (200 in FIG. 5f). When the voltage on the phase-3 transfer electrode 130 goes low, some of the signal charge may spill over the output gate onto the output diode, and the voltage at node A may go to the intermediate level 202 in FIG. 5f. Finally, when the voltage on the phase-4 transfer gate 132 goes low, all the signal charge is moved to the output diode 113 and the output signal at node A goes to its final signal level 204 as shown in FIG. 5f.

While the signal is at its reset level 200, a clamping pulse $\phi_{CL}$ (see FIG. 5g) is applied to clamping FET 140, then when the final signal level is present at node A, a sampling pulse $\phi_{S/H}$ is applied to sampling transistor 142, thereby storing the signal level present at node A on capacitor 143 while removing any variations due to reset level noise. The output at node B of amplifier 144 follows this signal as shown in FIG. 5i.

The voltage at node B is a step-wise smooth curve representing the successive values of the output signal (see FIG. 5i). Comparator 146 compares the first sample with a threshold value $V_{TH}$ (see FIG. 5i) stored on capacityor 148. If the sampled value is less than the threshold value, the output of comparator 146 at node C remains low. However, if the sampled value exceeds the threshold value, the output at node C goes high. At a point during the sample period, a sampling signal $\phi_S$ (see FIG. 5j) is applied to FET transistor 152. If the voltage at node C is low at this time, the low value will be applied to the gate of transistor 150 and will have no effect upon the state of the circuit. If, however, the voltage at node C is high, the high value will be applied to the gate of transistor 150, thereby applying the new higher reference voltage to capacitor 148. The new reference value is equal to the value at node B, thereby causing the output at node C to go low (see FIG. 5k). This process continues, producing a pulse at node C each time a new signal greater than any previous signal is received from the image sensing array.

At the start of the sequence, counter 118 is initialized. Each time a new charge packet is read from the CCD shift register, counter 118 is advanced (see FIG. 2). The pulse train produced by the peak detector at node C is applied to latch 116 which latches the output of counter 118 whenever a new pulse is produced by the peak detector. After all the charge packets in the CCD shift register have been read out, the count held by latch 116 is indicative of the location of the sensor element having the greatest illumination from the LED above the threshold level $V_{TH}$. At this point, the microprocessor retrieves the range data from the latch by interrogating its input port.

The range data are then used in a known manner to drive an output device such as a range display or focus servo.

When the rangefinder is employed in an auto focus camera, and no pulse is produced by the peak detector, either because the LED signal from a near object was below the threshold $V_{TH}$, or the object was beyond the range of the rangefinder, the focus servo drives the lens to the infinity focus position, thereby maximizing the probability that the object will be properly focused since all objects located between one half the hyper focal distance and infinity will be in acceptable focus. Normally, the threshold $V_{TH}$ is set sufficiently high so that there is an acceptably low probability that the rangefinder will indicate an incorrect range due to noise. However, since the photon limited signal-to-noise ratio of the rangefinder is inversely proportional to the square root of the ambient light level, the threshol $V_{TH}$ may be lowered in low ambient light levels, thereby increasing the sensitivity of the rangefinder device while maintaining the same low probability that the rangefinder will trigger on noise.

The maximum ambient light level can easily be determined by setting the threshold $V_{TH}$ at some intermediate value and operating the rangefinder without turning on the LED. If a peak greater than $V_{TH}$ is detected, the threshold is raised by some increment, and the process is repeated, until no peak is detected. If no peak is detected at the intermediate threshold value, the threshold is lowered by some increment, and the process is repeated, until a peak is detected. The final threshold value is indicative of the peak ambient light level. The threshold setting for operating the rangefinder is then determined as a function of the ambient light level, for example by consulting a look up table stored in computer memory.

The invention has been described with reference to a preferred embodiment thereof, however, it will be apparent that changes and modifications can be effected within the spirit and scope of the accompanying claims.

We claim:
1. A rangefinder device, comprising:
   means for projecting a beam of light for illuminating a spot on an object in a scene;
   linear image sensor means for viewing the scene and producing in response to periodic scanning signals, a series of photosignals representing the brightness of the scene; and
   signal processing means responsive to said series of photosignals for detecting the relative location of said spot in said scene and producing a distance signal in response thereto, said signal processing means including:
   counter means, advanced in synchronism with said scanning signals for producing a running count representative of the number of photosignals produced by said image sensor;
   latch means connected to said counter means and responsive to a latch signal for capturing and temporarily holding the current count at the time of receipt of said latch signal; and
   peak detector means, responsive to said series of photosignals for producing a latcn signal each time a new greater photosignal is produced by said image sensor means, said latch signal being supplied to said latch means, whereby, after said series of photosignals has been produced by said image sensor, the count held by said latch means represents the location of the image of said spot on said image sensor.
2. The invention claimed in claim 1, wherein said peak detector means, comprises:
   storage means for storing the value of the last greatest photosignal in said series;
   comparator means for comparing the value stored in said storage means with the next photosignal in said series, and producing an output signal in response to the value of said next photosignal being greater than said last greatest photosignal; and
   switch means responsive to said output signal for replacing the value on said storage means with said greater value.
3. The invention claimed in claim 2, wherein said peak detector means further includes threshold setting means for storing an initial threshold value in said storage means.
4. The invention claimed in claim 3, further comprising means for determining said initial threshold value as a function of ambient illumination.
5. A rangefinder device of the type having beam forming means for projecting a beam of light on a scene for illuminating a spot on an object in the scene, and a linear image sensor for viewing the scene to determine the relative location of the illuminated spot in the scene, and thereby determine the distance to the object, characterized in that:
   said linear image sensor includes scanning means (111) responsive to clock signals for producing a serial train of photosignals, a counter (118) advanced in synchronism with said clock signals for producing a running count of the number of photosignals in said serial train, a latch (116) connected to said counter (118) and responsive to a latch signal for capturing and temporarily holding the current count produced by said counter (118) at the time of receipt of said latch signal, and a peak de- tector (115) responsive to said serial train of photosignals for producing a latch signal each time a new greater photosignal is produced by said linear image sensor, said latch signal being supplied to said latch (116), whereby, after said serial train of photosignals has been produced, the count held by said latch represents the location of the image of said spot on said image sensor.

6. The invention claimed in claim 5, further characterized in that, said peak detector includes a storage capacitor (148) for storing the value of the last greatest photosignal in the serial train of photosignals, a comparator (146) for comparing the value stored on said storage capacitor with the next photosignal produced by said image sensor, and for producing an output signal in response to the value of said next photosignal being greater than said last greatest photosignal, and switch means (150, 152) responsive to said output signal for replacing the value on said storage capacitor with said greater value.

7. The invention claimed in claim 6, further characterized in that said peak detector includes threshold setting means (156 and 158) for storing an initial threshold value on said storage capacitor.

8. The invention claimed in claim 7, further characterized in that said rangefinder device includes means for determining said initial threshold value as a function of ambient illumination.

* * * * *